United States Patent [19]

Matsuura et al.

[11] Patent Number: 4,622,071
[45] Date of Patent: Nov. 11, 1986

[54] PROCESS FOR PRODUCING A HARDENED PRODUCT OF COAL ASH

[75] Inventors: Sadaji Matsuura; Satoru Ando; Masamitsu Kiso, all of Fuji, Japan

[73] Assignee: Fuji Fire-Proof Material Industry Co., Ltd., Shizuoka, Japan

[21] Appl. No.: 655,590

[22] Filed: Sep. 28, 1984

[30] Foreign Application Priority Data

Oct. 7, 1983 [JP] Japan ................................ 58-188031

[51] Int. Cl.$^4$ .............................................. C04B 7/02
[52] U.S. Cl. .................... 106/97; 106/15.05; 106/DIG. 1
[58] Field of Search ............... 106/DIG. 1, 97, 15.05

[56] References Cited

U.S. PATENT DOCUMENTS 2,698,251 12/1954 Shea et al. ............................. 106/98
3,870,535 3/1975 Minnick et al. ................ 106/DIG. 1
3,953,222 4/1976 Bainton ................................ 106/97
4,375,986 3/1983 Pichat ........................... 106/DIG. 1

FOREIGN PATENT DOCUMENTS 46-38970 11/1971 Japan ........................... 106/DIG. 1

Primary Examiner—William R. Dixon, Jr.
Assistant Examiner—Steven Capella
Attorney, Agent, or Firm—Birch, Stewart, Kolasch & Birch

[57] ABSTRACT

A hardened product of coal ash having strength sufficient as a civil engineering or construction material is obtained by treating coal ash with sulfuric acid and/or hydrochloric acid to obtain a first reaction mixture; treating the first reaction mixture with calcium carbonate to obtain a second reaction mixture; mixing the second reaction mixture with a hydraulic material and water to obtain a third reaction mixture; and shaping and curing the third reaction mixture.

19 Claims, No Drawings

PROCESS FOR PRODUCING A HARDENED PRODUCT OF COAL ASH

BACKGROUND OF THE INVENTION

This invention relates to a process for producing a hardened product of coal ash which has various uses (e.g. wallboard) as a fire-resistant civil engineering or construction material, especially a fire-resistant board.

In order to effectively utilize coal ash discharged from a thermoelectric power plant, there has been hitherto made an attempt of producing a hardened product of coal ash used as a civil engineering or construction material by mixing the coal ash with slaked lime or quickly lime. However the above-mentioned conventional method has not afforded a hardened product having practically sufficient strength.

SUMMARY OF THE INVENTION

An object of the present invention is to provide a process for producing a hardened product of coal ash which has practically sufficient strength and is preferably used as a civil engineering or construction material, especially a fire-resistant board.

Other and further objects of the invention will appear more fully from the following description.

As the results of extensive studies to obtain a more practical civil engineering or construction material from coal ash as a raw material, the present inventors have found that a hardened product of coal ash having strength sufficient as a civil engineering or construction material can be obtained by treating coal ash with sulfuric acid and/or hydrochloric acid to obtain a first reaction mixture; treating the first reaction mixture with calcium carbonate to obtain a second reaction mixture; mixing the second reaction mixture with a hydraulic material and water to obtain a third reaction mixture; and shaping and curing the third reaction mixture, to complete the present invention.

Accordingly, the process of the present invention for producing a hardened product of coal ash comprises:
  adding sulfuric acid and/or hydrochloric acid to coal ash and allowing them to react with each other to obtain a first reaction mixture;
  adding calcium carbonate to the first reaction mixture and allowing the first reaction mixture to react with the calcium carbonate to obtain a second reaction mixture;
  mixing the second mixture with water and at least one hydraulic materials selected from the group consisting of cement, slag, gypsum, slaked lime and quick lime to obtain a third reaction mixture; and shaping and curing the third reaction mixture.

DETAILED DESCRIPTION OF THE INVENTION

The embodiments of the present invention are hereinunder described in detail.

In practicing the present invention, sulfuric acid and/or hydrochloric acid, preferably sulfuric acid is first added to coal ash and they are allowed to react with each other to obtain a first reaction mixture. The reaction is preferably carried out by agitating and mixing the coal ash with sulfuric acid and/or hydrochloric acid at from room temperature to 90° C. for 10 to 20 minutes.

In case of using sulfuric acid, the concentration thereof is preferably 5 to 50 wt%. The preferable amount of surfuric acid is 5 to 50 parts by weight per 100 parts by weight of coal ash, when the sulfuric acid having a concentration of 20 wt% is used. By this reaction, the coal ash is decomposed, whereby silicon dioxide, aluminum oxide and the like therein are activated and simultaneously calcium sulfate, aluminum sulfate, potassium sulfate, calcium chloride, aluminum chloride, potassium chloride and the like are produced.

Next, calcium carbonate is added to the first reaction mixture obtained by the reaction of the coal ash with sulfuric acid and/or hydrochloric acid and they are allowed to react with each other to obtain a second reaction mixture. The preferable amount of calcium carbonate added is 1 to 10 parts by weight per 100 parts by weight of coal ash to achieve strength sufficient as a fire-resistant civil engineering or construction material. The calcium carbonate is preferably agitated and mixed with the first reaction mixture at from room temperature to 90° C. for 10 to 20 minutes.

Next, to the second reaction mixture obtained above are added a hydraulic material and water and they are mixed with each other to obtain a third reaction mixture. The mixing is conducted until the second reaction mixture is uniformly intermingled with the hydraulic material and water. As the hydraulic material there are exemplified cement, slag, gypsum, slaked lime, quick lime and the like. The amounts of the hydraulic material and water used are 10 to 100 parts by weight and 100 to 3000 parts by weight, respectively, per 100 parts by weight of coal ash.

As mentioned above, when the slag as the hydraulic material is mixed with the second reaction mixture, silicon dioxide, calcium sulfate and aluminum sulfate in the coal ash is reacted with calcium oxide in the slag to produce ettringite crystal and tobermorite crystal, whereby remarkably high strength is achieved.

In mixing the second reaction mixture with the hydraulic material and water, from 1 to 10 parts by weight of pulp, asbestos, synthetic fiber, inorganic fiber and light-weight aggregate (e.g. pearlite and balloon) may be added per 100 parts by weight of coal ash. Further sand, fine gravel or the like may be added, and the preferable amount thereof is 500 to 2000 parts by weight per 100 parts by weight of coal ash. Furthermore an inorganic or organic foaming agent may be optionally employed.

The second reaction mixture is directly mixed with the hydraulic material and water. However the second reaction mixture may be mixed with the hydraulic material and water after evaporating water therefrom and pulverizing it until a size of about 150 meshes. The second reaction mixture may be a reaction mixture obtained by reacting the first reaction mixture first with calcium carbonate and subsequently with slag. When the second reaction mixture thus obtained is used after pulverized in the same manner as mentioned above, there can be obtained a hardened product of coal ash having much higher strength. In this case, the amount of slag used is preferably 1 to 20 parts by weight per 100 parts by weight of coal ash.

By previously drying and pulverizing the second reaction mixture before mixing it with the hydraulic material and water, the dried and pulverized second reaction mixture can be stored for a certain period of time and thereafter it is mixed with the hydraulic material and water to obtain the third reaction mixture when a hardened product of coal ash is desired.

According to the present invention, the third reaction mixture obtained above is subsequently shaped and cured to obtain a hardened product.

The shaping of the third reaction mixture can be conducted by any shaping methods such as a method using a Fourdrinier or cylinder machine, an extrusion method, a pressing method and a casting method.

When the shaping of the mixture is conducted by the method using the Fourdrinier or cylinder machine, at least one fibrous materials selected from the group consisting of pulp, asbestos, synthetic fiber and inorganic fiber is added in the above-mentioned proportion together with the hydraulic material and water to the second reaction mixture.

The curing of the shaped mixture is usually conducted at normal temperature or with atmospheric pressure vapor or high pressure vapor. Curing time is about 12 hours when the temperature is 65° to 70° C.

As mentioned above, the hardened product of the present invention is obtained by treating coal ash with sulfuric acid and/or hydrochloric acid to obtain the first reaction mixture; treating the first reaction mixture with calcium carbonate to obtain the second reaction mixture; mixing the second reaction mixture with the hydraulic material and water to obtain the third reaction mixture; and shaping and curing the third reaction mixture. The hardened product obtained has a practically sufficient strength and can be used widely as a fire-resistant civil engineering or construction material, expecially a fire-resistant board.

The present invention will further be described by way of examples, wherein parts mean parts by weight.

EXAMPLE 1

To 100 parts of coal ash added 5 parts of sulfuric acid (concentration 50 wt%) and the resulting mixture was agitated and mixed at 20° C. for 20 minutes. Next, 3 parts of calcium carbonate was added thereto and the resulting mixture was agitated and mixed at 20° C. for 20 minutes. To the reaction mixture thus obtained were added 2000 parts of water, 50 parts of slag as a hydraulic material, 10 parts of asbestos and 5 parts of pulp as a fibrous material, and the mixture was agitated and mixed sufficiently. Thereafter the mixture was shaped with a cylinder machine and vaporcured at 60° C. for 15 hours to obtain a hardened product of the present invention having a size of 910 mm × 1820 mm × 5 mm.

EXAMPLE 2

The procedure of Example 1 was repeated except that 4 parts of sulfuric acid was used and 40 parts of slag was used as a hydraulic material to obtain a hardened product of the present invention.

EXAMPLE 3

The procedure of Example 1 was repeated except that 12 parts of slag and 20 parts of cement were used as a hydraulic material to obtain a hardened product of the present invention.

EXAMPLE 4

The procedure of Example 1 was repeated except that 5 parts of slaked lime was used as a hydraulic material to obtain a hardened product of the present invention.

EXAMPLE 5

The procedure of Example 1 was repeated except that 15 parts of slaked lime was used as a hydraulic material to obtain a hardened product of the present invention.

EXAMPLE 6

To 100 parts of coal ash was added 5 parts of sulfuric acid (concentration 50 wt%) and the resulting mixture was agitated and mixed at 20° C. for 20 minutes. Next, 3 parts of calcium carbonate was added thereto and the resulting mixture was agitated and mixed at 20° C. for 20 minutes. To the reaction mixture thus obtained were added 2000 parts of water and 50 parts of slag as a hydraulic material, and the mixture was agitated and mixed sufficiently. Thereafter the mixture was shaped and vapor-cured at 60° C. for 15 hours to obtain a hardened product of the present invention having a size of 910 mm × 5 mm.

The following table shows values of compressive strength ($Kg/cm^2$) and bending strength ($Kg/cm^2$) for the hardened products obtained in Examples 1 to 6.

TABLE

| Example No. | 1 | 2 | 3 | 4 | 5 | 6 |
|---|---|---|---|---|---|---|
| Compressive strength ($Kg/cm^2$) | 300 | 280 | 380 | 100 | 120 | 290 |
| Bending strength ($Kg/cm^2$) | 120 | 100 | 150 | 40 | 50 | 40 |

It will be obvious to those skilled in the art that many modifications may be made within the scope of the present invention without departing from the spirit thereof, and the invention includes all such modifications.

What is claimed is:

1. A process for producing a hardened fire-resistant board product of coal ash, which comprises:
   reacting at least one acid selected from the group consisting of sulfuric acid, and hydrochloric acid with coal ash to obtain a first reaction mixture;
   reacting calcium carbonate with first reaction mixture to obtain a second reaction mixture;
   mixing the second reaction mixture with water and at least one hydraulic material selected from the group consisting of cement, slag, gypsum, slaked lime and quick lime to obtain a third reaction mixture; and
   shaping and curing the third reaction mixture to obtain the hardened fire-resistant board product of coal ash.

2. The process according to claim 1, wherein the second reaction mixture is obtained by reacting the first mixture with calcium carbonate and then with slag; said second reaction mixture subsequently being mixed with water and at least one said hydraulic material to form said third reaction mixture.

3. The process according to claim 1 wherein prior to adding the hydraulic material and water, the second reaction mixture is dried and pulverized.

4. The process according claim 1, wherein at least one fibrous material selected from the group consisting of pulp, asbestos, synthetic fiber and inorganic fiber is added together with the hydraulic material and water to the second reaction mixture and mixed with each other to obtain the third reaction mixture and the third reaction mixture is shaped by a method using a Fourdrinier or cylinder machine.

5. The process according to claim 2 wherein prior to adding the hydraulic material and water, the second reaction mixture is dried and pulverized.

6. The process according to claim 1, wherein sulfuric acid is added to obtain the first reaction mixture.

7. The process according to claim 1, wherein hydrochloric acid is added to obtain a first reaction mixture.

8. The process according to claim 1, wherein sulfuric acid and hydrochloric acid are added to obtain a first reaction mixture.

9. The process according to claim 1, wherein both the acid reacting step and the calcium carbonate reacting step occur between room temperature and 90° C. for 10 to 20 minutes while agitating the mixtures.

10. The process according to claim 1, wherein the concentraion of sulfuric acid is 5 to 50 weight percent by weight of coal ash.

11. The process according to claim 1, wherein the amounts of the hydraulic material and water used are 10 to 100 parts by weight and 100 to 3000 parts by weight, respectively, per 100 parts by weight of coal ash.

12. The process according to claim 1, wherein the mixing of the second reaction mixture with the hydraulic material and water step further comprises mixing from 1 to 10 parts by weight of at least one material selected from the group consisting of pulp, asbestos, synthetic fiber, inorganic fiber and pearlite per 100 parts by weight of coal ash.

13. The process according to claim 1, wherein 500 to 2000 parts by weight of sand or fine gravel per 100 parts of coal ash are added while mixing the second reaction mixture with the hydraulic material and water.

14. The process according to claim 1, wherein an inorganic or organic foaming agent is added.

15. The process according to claim 1, wherein the method for shaping is selected from the group consisting of Fourdrinier processing, cylinder processing, extrusion, pressing and casting.

16. The process according to claim 1, wherein the curing time is about 12 hours at a temperature of 65° to 70° C.

17. The process according to claim 16, wherein curing is at an atmospheric pressure or high pressure.

18. The process according to claim 2, wherein the amount of slag is 1 to 20 parts by weight per 100 parts by weight of coal ash.

19. The process according to claim 6, wherein the hydraulic material is slag or slaked lime.

* * * * *